Dec. 9, 1952     B. N. ASHTON ET AL     2,621,004
RETRACTABLE LANDING GEAR
Filed June 16, 1950     2 SHEETS—SHEET 1
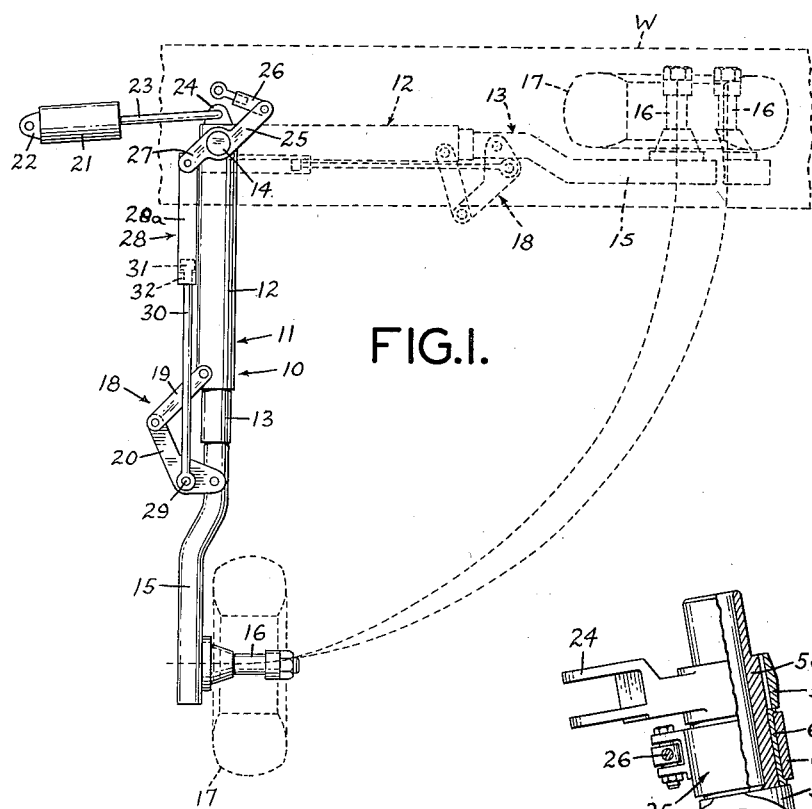
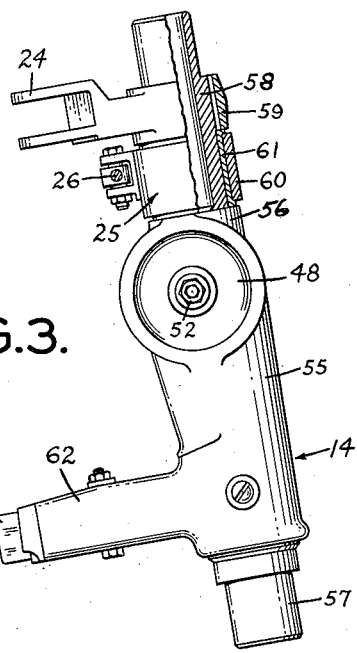
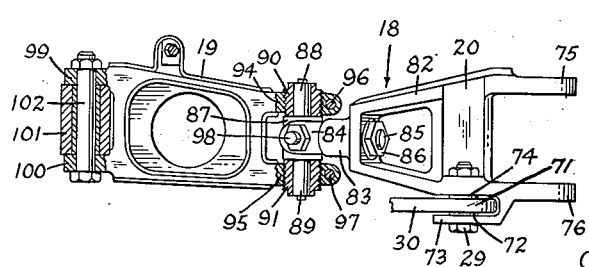
INVENTORS.
BENJAMIN N. ASHTON
EDMUND D. HOLLAND
ROY A. WULFF
BY
Campbell, Brumbaugh, Free & Graves
THEIR ATTORNEYS.

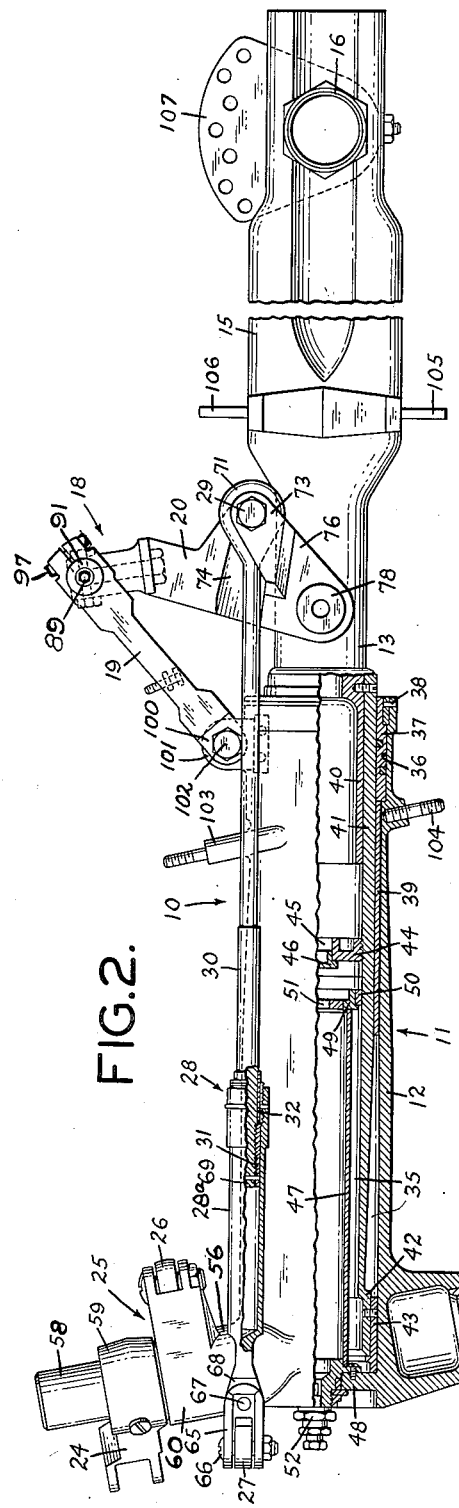
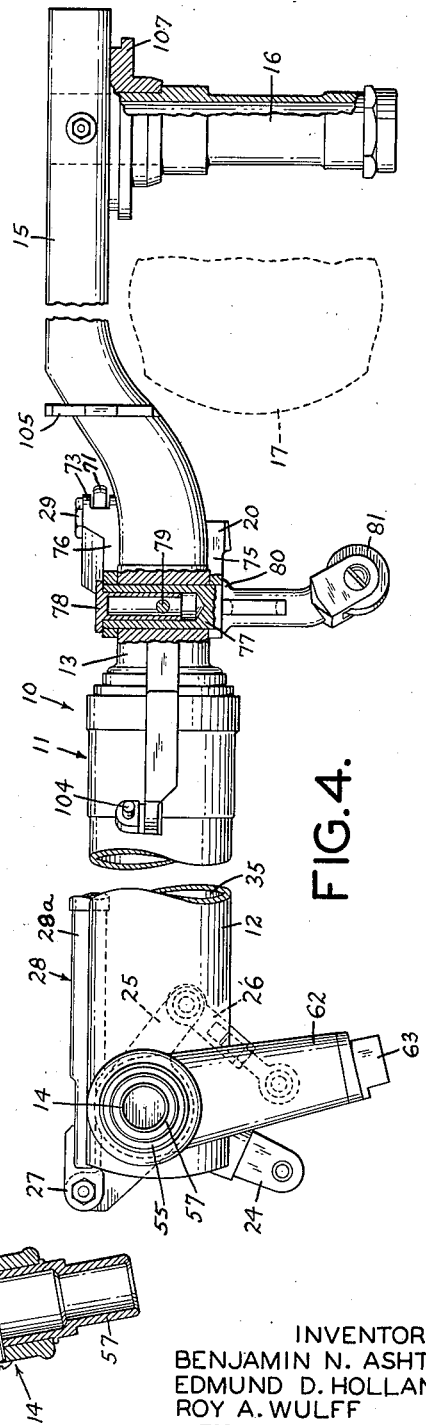

Patented Dec. 9, 1952

2,621,004

UNITED STATES PATENT OFFICE 2,621,004

RETRACTABLE LANDING GEAR

Benjamin N. Ashton and Edmund D. Holland, Kingston, and Roy A. Wulff, Hurley, N. Y., assignors to Electrol Incorporated, Kingston, N. Y., a corporation of Delaware Application June 16, 1950, Serial No. 168,618

7 Claims. (Cl. 244—102)

This invention relates to landing gear for aircraft and it relates particularly to an improved retractable landing gear for high speed aircraft.

In fighting planes of the jet or high power, reciprocating engine types, the space within the wings for receiving landing gear has become increasingly restricted. The presence of gun mounts, fuel tanks and remote control systems for the wing flaps, together with the increase in length of the landing gear to accommodate longer propellers and the like, has made it necessary to provide mechanisms for reducing the overall length of (shrinking) the landing gear to fit it into the limited space remaining in the wings. Prior mechanisms for shrinking the landing gear have been complicated and heavy and generally not very satisfactory for the purpose.

This invention comprises a simple and effective mechanism for shrinking the landing gear which requires relatively few parts, in addition to the usual elements of the landing gear, for shrinking the gear.

The mechanism for accomplishing the shrinkage includes a member which is fixed with relation to the airplane wing or other member into which the gear is to be retracted by swinging movement. This member is connected by means of a variable length link to one arm of the torque toggle which connects, and prevents relative rotation of, the piston and the cylinder of the oleo strut of the landing gear. The arrangement of the link is such that the action of the oleo strut in absorbing shock is not in any way altered or restricted. However, when the landing gear is swung about its supporting pivot axis during retraction, the link collapses the toggle partially to draw the piston into the cylinder of the oleo strut, thereby decreasing the overall length of, or shrinking, the landing gear. Inasmuch as shrinking of the landing gear arises directly from movement of the latter during retraction, no other power means is required than the motor use to move the landing gear from extended to retracted position.

The landing gear also is substantially self-extending because of the energy stored in the oleo strut by the shrinking mechanism so that even when the power supply for the retracting motor is destroyed, or damaged, the landing gear can be extended, in part by the action of its oleo strut, and, in part by gravity, to permit safe landing of the airplane.

For a better understanding of the invention, reference may be had to the accompanying drawing, in which:

Fig. 1 is a schematic drawing of the right-hand landing gear viewed from in front shown in extended position, in full lines, and in retracted position, in dotted lines, to illustrate its operation;

Fig. 2 is a plan view, partly in section, of the left-hand landing gear embodying the present invention with the axle for the landing wheel extending downwardly perpendicular to the plane of the paper;

Fig. 3 is a view in elevation looking toward the upper end of the landing gear, with parts omitted and parts shown in section to disclose details of construction;

Fig. 4 is a view in side elevation and partly in section and broken away of the landing gear; and Fig. 5 is a fragmentary view, partly in section of the torque toggle of the oleo strut.

The principles underlying the operation and the basic structure, of the landing gear are illustrated in Fig. 1 of the drawing which shows schematically the action of a landing gear embodying the invention, during extension and retraction. Some of the parts of the landing gear are shown in Fig. 1 in a different relation than they have in the landing gear disclosed in Figs. 2 to 5, inclusive to afford a better understanding of the device. As shown in Fig. 1, the landing gear 10, in this case, the right-hand gear for the airplane, includes an oleo strut 11 including a cylinder 12 and a piston 13. The cylinder is mounted for pivotal movement about the axis of a supporting shaft 14 mounted within the wing of the airplane.

The piston 13 carries the landing gear fork 15 having at its lower end the stub axle 16 on which the wheel and tire 17 are mounted. The cylinder 12 and the piston 13 of the landing gear are connected by the usual toggle 18 including an upper torque arm 19 and a lower torque arm 20 which permit relative axial movement of the cylinder 12 and piston 13 but prevent relative rotation of these two members. The toggle 18 is shown as projecting parallel with the axis of the axle 16, but, in a normal assembly, it will be substantially perpendicular to the axis of the axle 12 and located behind the oleo strut as viewed in Fig. 1.

The landing gear 10 may be swung between the extended position shown in full lines in Fig. 1 and the retracted position within the wing W, as shown in dotted lines in Fig. 1. Inasmuch as the space available for the landing gear is quite restricted, it is necessary to shrink the landing gear. This is accomplished by means of the following construction.

The landing gear is swung between its two positions by means of a hydraulic cylinder 21 which is pivotally connected by means of a lug 32 to a fixed element in the wing or fuselage of the airplane and has its piston rod 23 connected to an arm or lever 24 fixed to the oleo strut 11. Inward movement of the piston rod 23 swings the landing gear 10 to retracted position and outward movement of the piston rod swings the landing gear to extended position.

Mounted concentric with the shaft 14 is a bell crank or two-arm lever member 25 which has one end connected by means of an adjustable link 26 to a fixed member in the wing of the aircraft so that rotation of the member 25 is prevented. The lower arm 27 of the member 25 is connected by means of a variable length link 28 to a pivot pin 29 on the lower torque arm 20 between its ends. The link 28 consists essentially of a sleeve 28a receiving slidably a rod 30 having an enlargement 31 on its upper end which cooperates with a flange 32 in the sleeve 29 to prevent separation of the sleeve 29 and the rod 30, thereby limiting the overall length of the link 28 to a predetermined maximum. The link can, however, telescope or contract freely in length to permit action of the oleo strut.

The maximum overall length of the link 28 is such that it permits substantially full extension of the oleo strut.

The link acts in combination with the fixed lever member 25 to shrink the overall length of the landing gear in the following manner.

Inasmuch as the upper end of the link 28 is pivotally connected to the end of the arm 27 at a point below and to the left of the axis of the shaft 14, i. e., eccentric to the axis of rotation of the landing gear, the latter and the outer end of the link will describe arcs which are eccentric to each other as the landing gear moves to the retracted position. The eccentric mounting of the link together with the inextensibility of the link 28 when fully extended, pulls the lower torque arm 20 inwardly so that the toggle is collapsed at least partially. The wheel and tire 17 accordingly are drawn inwardly, contracting the oleo strut, and the length of the landing gear is decreased in proportion to the eccentricity of the inner end of the link 28.

The invention will now be described with reference to a typical embodiment of the invention as constructed for use in air craft.

Figs. 2 to 5 of the drawing illustrate the left-hand landing gear detached from the aircraft to disclose details thereof more clearly. In the form of landing gear illustrated, the oleo strut 11 may be of any conventional type but, preferably, it is constructed in the manner best shown in Fig. 2 of the drawing. The cylinder 12 is a part of an integral casting or the like which also includes the shaft 14 about the axis of which the entire landing gear pivots for movement between retracted and extended positions. The shaft 14, described in greater detail hereinafter, is inclined to the axis of the cylinder in order to permit the landing gear to swing downwardly and forwardly into a suitable relation to the aircraft. The cylinder 12 may consist of a sleeve which tapers toward its lower end and has a cylindrical bore 35 therein for receiving the piston 13. The lower end of the cylinder 12 is counterbored at 36 to receive a sleeve 37 which is threaded into the lower end of the cylinder and retained therein by means of a pin 38. The sleeve 37 supports a spacing sleeve 39 which limits the outward movement of the piston 13 relative to the cylinder 12.

The piston 13 includes a hollow shank portion 40 on the upper end of the landing gear fork which is received within an elongated sleeve 41 and pinned or otherwise secured thereto. The sleeve 41 fits the sleeve 37 tightly but slidably and may be retained in fluid-tight relation thereto by means of suitable sealing rings or packings. The inner end of the sleeve 41 is tapered and then provided with a flared cylindrical portion 42 at its inner end upon which is mounted a tubular piston portion 43 in sliding engagement with the inner surface of the cylinder 12. The piston portion 43 is engageable with the inner end of the spacing sleeve 39 when the oleo strut 11 is fully projected and thereby limits outward movement of the piston 13.

The piston 13 also includes a piston head 44 about midway of the length of the sleeve 41, the piston head consisting of a ring 44, U-shaped in cross-section, which is threaded into or otherwise fixedly secured to the interior of the sleeve 41. The opening 45 in the middle of the ring 44 is closed by a threaded sealing plug 46.

The cylinder 12 also includes an internal sleeve 47 which is received telescopically within the piston sleeve 41 and is secured at its upper end to the cylinder head 48. The sleeve carries at its lower end an annular partition member 49 which has a packing or piston ring 50 in sliding engagement with the interior surface of the piston sleeve 41. The partition 49 has a central aperture 51 to meter the flow of liquid therethrough.

The piston head 48 carries a removable air check valve 52 by means of which air under pressure and hydraulic fluid can be introduced into the interior of the cylinder to exert the shock absorbing action which characterizes an oleo strut.

The shaft 14 includes oppositely directed hub portions 55 and 56 which have hollow axles 57 and 58 adapted to be journalled in suitable bearings in the aircraft wing structure. While this structure is illustrated as hollow, it will be understood that it can be solid, if desired.

The hub portion 56, as best shown in Figs. 2 and 4, carries the lug or lever 24 to which the actuating cylinder 21 is connected. The lever 24 includes a circular bushing 59 which is splined or keyed to the hub 56 so that the entire shaft 14 and the oleo strut 10 move with the lever 24. The end of the lever 24 is bifurcated to receive the end of the piston rod 23.

Between the lever 24 and the oleo strut 11 is mounted the lever 25. The lever 25 includes a central ring or bearing portion 60 which is rotatably mounted on a bushing 61 on the hub 56 permitting relative movement of the axle 14 with respect to the lever 25.

The shaft 14 also carries a locking lug or arm 62 which extends perpendicular to the axis of the shaft 14 and is provided with a rectangular end portion 63 for engagement by a complemental locking sleeve, not shown, in the aircraft for locking the landing gear in extended position. Locking lugs of this general type are well-known.

The extensible link structure 28 referred to above is best shown in Fig. 2. The link 28 includes a tubular portion or cylinder 28a which is connected to the lower end 27 of the bell crank lever 25. A universal connection is interposed between the sleeve 28a and the end 27 of the lever to compensate for relative movements of parts and any possible misalignment thereof. The universal connection includes a clevis member 65 connected by means of a pivot bolt 66 to the end 27 of the lever and having a right-angularly related pivot pin 67 which extends through an eye 68 on the upper end of the sleeve 28a.

The link shaft or rod 30 carries at its inner end a cylindrical member forming the enlargement 31. The member 31 is threaded on and pinned to the end of the rod 30.

The enlargement 31 cooperates with the sleeve 32 which is threaded into the lower end of the cylinder 29. The sleeve 32 can be screwed into or out of the cylinder to regulate the length of the link 28.

The lower end of the link rod 30 is provided with an eye 71 for receiving a semi-spherical bearing 72 (Fig. 5), the inner portion of which receives the pivot bolt 29 to couple the link to the lower arm 20 of the toggle 18. As best shown in Fig. 5, the bolt 29 extends through an arm 73 which extends parallel with a flat surface 74 on the arm 20 to form a U-shaped cavity for reception of the eye 71 on the rod. Due to the presence of the semi-spherical bearing, limited universal movement of the lower end of the rod is permitted with respect to the toggle arm 20.

As shown in Figs. 2, 4 and 5, the toggle arm 20 has a pair of spaced apart lugs 75 and 76 thereon which straddle the landing gear fork 15 and are received on a hollow shaft member 77 extending through the landing gear fork. The lugs 75 and 76 are retained in position by means of a headed sleeve 78 extending into the interior of the shaft 77 and retained there by means of a cross pin or bolt 79. The head of the sleeve overlies the arm 76. The other arm 75 is also retained securely by means of a flange 80 on an extension of the shaft 77 which carries a roller 81 at its outer end. The roller 81 is adapted to cooperate with a track, not shown, in the airplane wing to prevent the oleo strut from expanding and locking the gear in the wheel well, if, for example, the link 28 should break or be shot away. By thus restraining the outward extension of the oleo strut, it can be lowered by gravity to permit safe landing.

The toggle arm 20 further includes an open frame-like upper end 82 in which is mounted a stud 83 provided with a yoke-like or bifurcated upper end portion 84. The stud 83 may have a threaded inner end 85 for receiving a clamping nut 86 by means of which the stud 83 can be rotated and adjusted with respect to the frame 82.

The bifurcated portion 84 of the stud straddles a bushing or block member 87 provided with stub shafts 88 and 89 mounted within bearings 90 and 91 respectively in the upper toggle arm 19.

The bushings or bearings 90 and 91 are mounted in split sleeves 94 and 95 in the lower end of the toggle arm 19, the outer ends of these sleeves receiving clamping bolts 96 and 97 which can be tightened to grip the bearings and retain them in position. The split sleeves permit endwise adjustment of the bearings and the block 87 to compensate for, or make possible correction of, misalignment of the various elements. The bifurcated portion 84 is pivotally connected to the block 87 by means of a cross pin or bolt 98 which permits pivoting movement of the stud and the lower arm 20 with respect to the upper arm 19. Thus, limited universal relative movement of the arms 19 and 20 is possible. The upper end of the upper toggle arm 19 is also provided with spaced bearing lugs 99 and 100 which straddle a bearing block 101 fixedly mounted on the lower end of the cylinder 12. A cross bolt 102 connects the lugs 99 and 100 to the bearing block 101 for pivotal movement relative thereto.

The landing gear may, of course, be provided with other structural members, such as, for example, the stud bolts 103 and 104 and the flanges 105 and 106 for receiving and supporting the fairings for the landing gear. The landing gear fork may be provided with the usual support 107 for the brake shoes. Also, other elements may be provided for supporting the cooperating elements of the wing sections, fairings and the like, as may be required.

It will be understood, of course, that all pivot points or bearings may be provided with lubricating fittings and that other provisions may be made for lubricating the oleo strut and the like as required.

From the preceding description, and especially the description of the operation of a typical landing gear, it will be understood that as the landing gear swings from projected to retracted position, the extensible link 28 will cause the toggle 18 to collapse because of the eccentric mounting of the upper end of the link 28 with respect to the axis of the supporting shaft 14 and that a decrease in the overall length of the landing gear occurs as it is retracted. Also, as indicated before, contraction of the landing gear stores energy therein which will tend to extend the landing gear, and, in so doing, will cause the landing gear to swing downwardly to projected position. This action occurs even if the hydraulic actuating system is disabled or if the contracting link should be shot away because the force is exerted on the guide roller 81 which permits the entire assembly to ride downwardly along the track and out of the wing well under the influence of gravity and permitting the landing gear to move to fully extended position where it may be locked by means of the locking lug 63.

It will be understood further that the landing gear is susceptible to considerable modification in the details of the oleo strut, the specific structure of the retracting link and in the details of the torque toggle. Therefore, the form of the invention disclosed herein should be considered as illustrative and not as limiting the scope of the following claims.

We claim:

1. In a retractable landing gear having an oleo strut mounted at one end for swinging movement about a pivot axis from extended position to retracted position and a torque toggle having a pair of pivotally connected arms connecting the relatively movable piston and cylinder of the oleo strut to prevent their relative rotation; the combination of a contractible link, a fixed member eccentric to said pivot axis and on the opposite side of said pivot axis from said oleo strut when the latter is in retracted position, means connecting one end of said link pivotally to said fixed member, and means connecting the other end of said link pivotally to one of said torque arms, said link being inextensible beyond a predetermined length to collapse said toggle and compress said oleo strut as the landing gear swings to retracted position.

2. In a retractable landing gear having an oleo strut including a cylinder and a piston supported for swinging movement from extended position to retracted position about a pivot axis, a torque toggle having a pair of pivotally connected arms, one arm being pivotally connected at one end to said piston, the other arm being pivotally connected at one end to said cylinder, and a wheel fork mounted on said piston; the combination of a contractible link having one end pivotally connected to one of said toggle arms between its ends, a fixed member adjacent to said pivot axis, and means pivotally connecting the other end of said link to said fixed member at a point eccentric to said pivot axis and on the opposite side thereof from said toggle when said landing gear is retracted, said link being of such maximum length as to collapse said toggle at least partially and contract said oleo strut as the latter swings to retracted position.

3. In a retractable landing gear having an oleo strut including a cylinder and a piston supported for swinging movement from extended position to retracted position about a pivot axis, a torque toggle having a pair of pivotally connected arms, one arm being pivotally connected at one end to said piston, the other arm being pivotally connected at one end to said cylinder, and a wheel fork mounted on said piston; the combination of a contractible link having one end pivotally connected to one of said toggle arms between its ends, a fixed member adjacent to said pivot axis, and means pivotally connecting the other end of said link to said fixed member at a point eccentric to said pivot axis and on the opposite side thereof from said toggle when said landing gear is retracted, the maximum length of said link being about the same as the distance between said point and the connection of said link with said arm when the gear is substantially fully extended.

4. In a retractable landing gear having an oleo strut including a cylinder and a piston reciprocable therein, a torque toggle having arms pivotally connected to each other at adjacent ends and outer ends pivotally connected to said cylinder and piston to prevent relative rotation thereof, a shaft at one end of said shaft supporting the latter for pivoting movement between an extended position and a retracted position, power means for moving said strut between said positions, and means to support a landing wheel at the outer end of said strut; the combination of a link member having relatively movable portions to vary the length of the link, means in said link for limiting the overall length of the link to a predetermined maximum, a fixed member mounted adjacent to said supporting shaft, means connecting one end of said link to said fixed member for pivoting movement about an axis eccentric to the axis of said shaft and at the opposite side of said shaft from said oleo strut when the latter is in said retracted position, and means connecting the other end of said link pivotally to one of said toggle arms between its pivot connections, the maximum length of the link being insufficient to permit full extension of said oleo strut when the latter is in its retracted position.

5. In a retractable landing gear having an oleo strut including a cylinder and a piston reciprocable therein, a shaft at one end of said strut supporting the latter for pivoting movement between an extended position and a retracted position, power means for moving said strut between said positions, and means to support a landing wheel at the outer end of said strut; the combination of a link member having relatively movable portions to vary the length of the link, means in said link for limiting the overall length of the link to a predetermined maximum, a two-arm lever rotatably mounted on said shaft, means connected to one arm of said lever for retaining the lever against rotation, means connecting one end of said link to the other arm of said lever for pivoting movement about an axis eccentric to the axis of said shaft and at the opposite side of said shaft from said oleo strut when the latter is in said retracted position, and means connecting the other end of said link pivotally to said strut adjacent to its outer end, the maximum length of the link being insufficient to permit full extension of said oleo strut when the latter is in said retracted position.

6. In a retractable landing gear having an oleo strut including a cylinder and a piston reciprocable therein, a shaft at one end of said strut supporting the latter for pivoting movement between an extended position and a retracted position, power means for moving said strut between said positions, and means to support a landing wheel at the outer end of said strut; the combination of a link member having a pair of telescopically related portions to vary the length of the link, means in said link for limiting the overall length of the link to a predetermined maximum, a two-arm lever rotatably mounted on said shaft, means connected to one arm of said lever for retaining the lever against rotation, means connecting one end of said link to the other arm of said lever for pivoting movement about an axis eccentric to the axis of said shaft and at the opposite side of said shaft from said oleo strut when the latter is in said retracted position, and means connecting the other end of said link pivotally to said strut adjacent to its outer end, the maximum length of the link being insufficient to permit full extension of said oleo strut when the latter is in its retracted position.

7. In a retractable landing gear having an oleo strut including a cylinder and a piston reciprocable therein, a torque toggle having arms pivotally connected to each other at adjacent ends and outer ends pivotally connected to said cylinder and piston to prevent relative rotation thereof, a shaft at one end of said strut supporting the latter for pivoting movement between an extended position and a retracted position, power means for moving said strut between said positions, and means to support a landing wheel at the outer end of said strut; the combination of a link member having relatively movable portions to vary the length of the link, means in said link for limiting the overall length of the link to a predetermined maximum, a two-arm lever rotatably mounted on said shaft, means connected to one arm of said lever for adjusting said lever angularly about the axis of said shaft and for retaining the lever against rotation, means connecting one end of said link to the other arm of said lever for pivoting movement about an axis eccentric to the axis of said shaft and at the opposite side of said shaft from said oleo strut when the latter is in said retracted position, and means connecting the other end of said link pivotally to one of said toggle arms between its pivot connections, the maximum length of the link being insufficient to permit full extension of said oleo strut when the latter is in its retracted position.

BENJAMIN N. ASHTON.
EDMUND D. HOLLAND.
ROY A. WULFF.

REFERENCES CITED

The following references are of record in the file of this patent:

UNITED STATES PATENTS

| Number | Name | Date |
| --- | --- | --- |
| 2,390,661 | Parilla | Dec. 11, 1945 |
| 2,478,426 | Satre | Aug. 9, 1949 |